United States Patent
Xue et al.

(10) Patent No.: US 8,670,449 B2
(45) Date of Patent: Mar. 11, 2014

(54) DATA STORAGE SYSTEM IN COMMUNICATION NETWORK AND DATA INFORMATION PROCESSING METHOD

(75) Inventors: Haiqiang Xue, Beijing (CN); Congxing Ouyang, Beijing (CN); Bing Wei, Beijing (CN); Xiaoyun Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 714 days.

(21) Appl. No.: 12/499,375

(22) Filed: Jul. 8, 2009

(65) Prior Publication Data
US 2010/0034206 A1 Feb. 11, 2010

(30) Foreign Application Priority Data
Jul. 8, 2008 (CN) .......................... 2008 1 0116321

(51) Int. Cl.
*H04L 12/28* (2006.01)
(52) U.S. Cl.
USPC ...................................... 370/395.32; 254/351
(58) Field of Classification Search
None
See application file for complete search history.

(56) References Cited

U.S. PATENT DOCUMENTS

| | | | |
|---|---|---|---|
| 6,301,612 B1* | 10/2001 | Selitrennikoff et al. | 709/220 |
| 6,651,077 B1* | 11/2003 | East et al. | 1/1 |
| 7,418,466 B1* | 8/2008 | Mills | 1/1 |
| 2009/0182842 A1* | 7/2009 | Dutta et al. | 709/218 |
| 2009/0285190 A1* | 11/2009 | Baron et al. | 370/338 |
| 2010/0008258 A1* | 1/2010 | Ji et al. | 370/254 |
| 2010/0034206 A1* | 2/2010 | Xue et al. | 370/400 |

* cited by examiner

*Primary Examiner* — Robert Wilson
(74) *Attorney, Agent, or Firm* — Workman Nydegger (57) ABSTRACT

The present invention discloses a data storage system in a communication network, which enables distributed storage of data. The system includes front end nodes, storage nodes, super nodes and management nodes. The operation units are located in the front end nodes, the super nodes or the storage nodes and each adapted to operate a first data GUID by a preset fixed offset to derive a second data GUID, to determine, from loop link information obtained from the management node and the second data GUID, a super node with a node identifier closest to the second data GUID, and to forward a service request carrying the second data GUID and a backup flag to the determined super node. The invention further discloses a data information processing method using the system.

21 Claims, 5 Drawing Sheets

- ● Management node
- ○ Storage node
- ◯ Super node
- △ Front end node

DATA STORAGE SYSTEM IN COMMUNICATION NETWORK AND DATA INFORMATION PROCESSING METHOD

Priority is claimed with respect to Chinese patent application No. 200810116321.2 filed on Jul. 8, 2008, the disclosure of which is incorporated herein by reference in its entirety.

FIELD OF THE INVENTION

The present invention relates to the field of communications and in particular to a data storage system in a communication network and a data information processing method.

BACKGROUND OF THE INVENTION

A Home Subscriber Server (HSS) is a centralized subscriber database system which stores authentication information of a subscriber, service information of the subscriber, roaming information of the subscriber, relevant information indicating which core network serves the subscriber, information relevant to an authorization function of the subscriber, etc. The HSS is also adapted to record and provide original accounting data of the subscriber for a sorting system for output of a bill. Stated otherwise, the HSS stores information relevant to Authentication, Authorization and Accounting (AAA) of the subscriber.

A centralized storage structure is adopted for an existing IP Multimedia Subsystem (IMS) architecture, and an HSS typically stores information of millions of subscribers and has to support 1000 queries and 100 modifications per second. This is demanding for performance of the HSS and consequently renders the HSS expensive. Further, to guarantee 99.999% reliability of a system at a telecommunications level, the HSS utilizes at least a primary server and a backup server, and the backup server takes over the load originally imposed over the primary server when the primary server fails, which consequently doubles already extremely high hardware cost; and a delay may occur to activate the backup server after the primary server fails if the backup server is not located at the same physical address as the primary server, and the backup server may be prone to a failure when the primary server fails if the backup server is located at the same physical address as the primary server. Alike, as a result of such a centralized storage approach in the HSS, storage performance of the IMS architecture can typically be improved only by hardware improvements, which nevertheless is both difficult and inconvenient to a network topology, and consequently it is difficult to cater to increasing demands of subscribers.

Additionally, a roaming location and a home location are distinguished in a solution for the existing IMS architecture, and an HSS provides subscriber data for a local Serving Call Session Control Function (S-CSCF) only; and when roaming to another location, a subscriber has to firstly register with a Visited Location Register (VLR) at the roaming location and then obtain subscriber information from the HSS at the home location through the VLR, and this implementation process is burdensome and requires a complex signaling flow.

SUMMARY OF THE INVENTION

Embodiments of the invention provide a data storage system in a communication network and a data information processing method, which are adapted to enable distributed storage of data.

A data storage system in a communication network includes front end nodes, storage nodes, super nodes and management nodes, wherein:

the management nodes comprise:

an allocation software stored in a first storage medium to allocate node identifiers for the storage nodes and the super nodes in a hash space, wherein, the storage nodes and the super nodes are arranged into a loop link according to the node identifiers;

the first storage medium to store information of the loop link, wherein, the information of the loop link comprises node identifiers and routing information for the storage nodes and the super nodes in the loop link; and a first transmit software stored in a first storage medium to transmit the information of the loop link to the front end nodes, and the super nodes;

the front end nodes comprise:

a first receive software stored in a second storage medium to receive the information of the loop link from the management nodes, and to receive a service request carrying a data identifier;

a first processing software stored in a second storage medium to derive a current data Global Unique Identifier, GUID, using a hash algorithm with the data identifier from the hash space;

a first obtainer software stored in a second storage medium to obtain, from the node identifiers for the super nodes in the information of the loop link, a current super node identifier for a current super node closest in value to the current data GUID; and a second transmit software stored in a second storage medium to send the service request and the current data GUID to the current super node according to routing information of the current super node in the information of the loop link;

the super nodes comprise:

a second receive software stored in the third storage medium to receive the information of the loop link from the management nodes, and to receive the service request and the current data GUID from the front end nodes;

a second obtainer software stored in the third storage medium to determine, from the node identifiers for the storage nodes in the information of the loop link, a current storage node identifier for a current storage node closest in value to the current data GUID; and a third transmit software stored in the third storage medium to send the service request and the current data GUID to the current storage node according to routing information for the current storage node; and the storage nodes comprise:

a third receive software stored in the forth storage medium to receive the service request and the current data GUID; and a second processing software stored in the forth storage medium to process data information corresponding to the current data GUID in response to the service request received by the third receive software.

A method for processing data information includes:

receiving a service request carrying a data identifier;

deriving a current data Global Unique Identifier, GUID, using a hash algorithm with the data identifier;

determining, from node identifiers for storage nodes in pre-stored information of a loop link, a current node identifier for a current storage node closest in value to the current data GUID;

transmitting the service request and the current data GUID to the current storage node with the current node identifier closest in value to the current data GUID; and instructing the current storage node to process data information corresponding to the current data GUID in response to the service request.

A method for updating data information includes:

deriving by a first storage node, when the first storage node recovers service provision, a second data Global Unique Identifier, GUID, by adding a preset fixed offset to a first data GUID stored in the first storage node;

determining by the first storage node, from node identifiers for storage nodes in pre-stored information of a loop link, a node identifier for a second storage node closest in value to the second data GUID;

comparing, by the first storage node, data information corresponding to the second data GUID and marked with a backup flag in the second storage node with the node identifier closest in value to the second data GUID with data information corresponding to the first data GUID in the first storage node; and updating, by the first storage node, the data information corresponding to the first data GUID in the first storage node with the data information corresponding to the second data GUID and marked with the backup flag in the second storage node, when a result of the comparison is that the data information corresponding to the second data GUID and marked with the backup flag in the second storage node is temporally later than the data information corresponding to the first data GUID in the first storage node.

The embodiments of the invention provide a data storage system which enables distributed storage of data information, and if the system is applied to improve the existing HSS, then the existing centralized structure can be replaced with the distributed structure, and the current expensive HSS can be replaced with a plurality of general servers to thereby save a networking cost.

DETAILED DESCRIPTION OF THE EMBODIMENTS

Embodiments of the invention enable distributed storage of data through front end nodes, super nodes and storage nodes, and manage a data storage system consisted of such three kinds of nodes through management nodes. Further, copies of data information are stored on the different storage nodes in the data storage system for the backup purpose, and since a primary server and a backup server are not distinguished for any storage node in the data storage system, when a storage node fails, another storage node where backup of the data information of the failing storage node is stored can take the place of the failing storage node immediately. Furthermore, the storage nodes are distributed separately, for example, distributed by regions, and such a possibility that the storage nodes storing the same data information fail concurrently is extremely low.

The data storage system in the embodiments of the invention is generally applicable to a communication network, and can store subscriber information, service information, etc., in the communication network. In the embodiments of the invention, information that can be stored is referred to as data information, and an identifier for identifying the data information is referred to as a data identifier.

Figure 1:
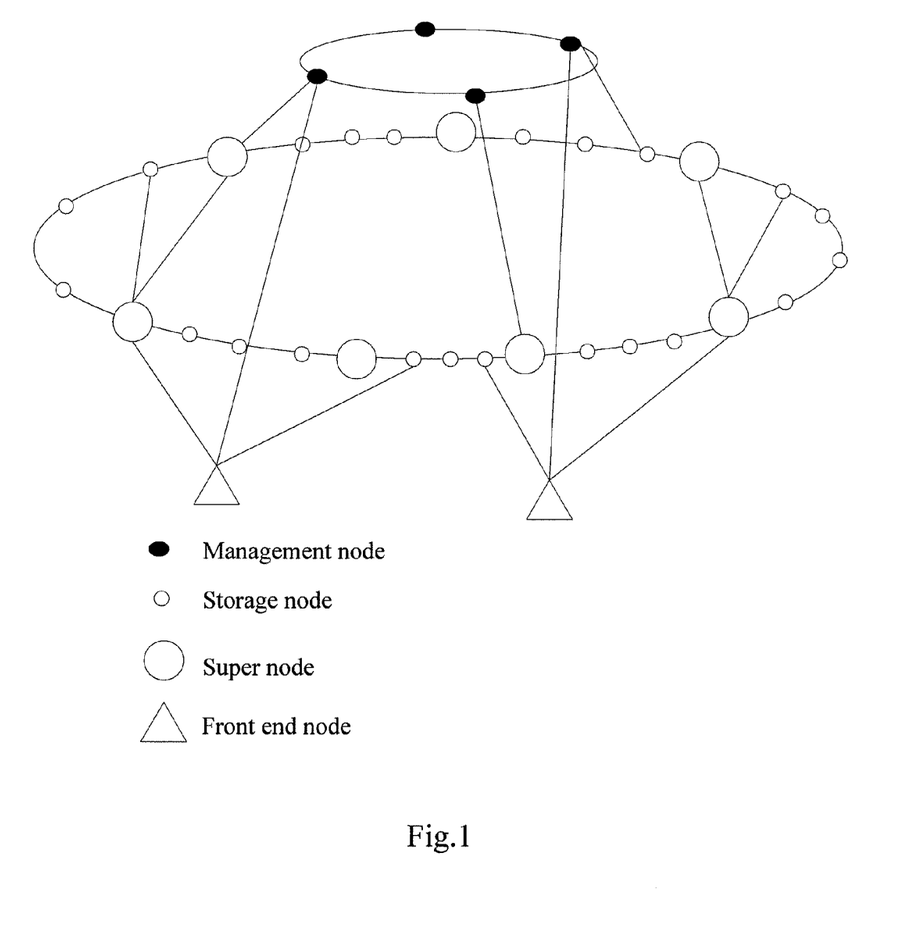
FIG. 1 is a structural diagram of a data storage system in an embodiment of the invention.

Referring to FIG. 1, an embodiment of the invention provides a data storage system including front end nodes, storage nodes, super nodes and management nodes.

The management nodes are adapted to allocate node identifiers for the storage nodes and the super nodes in a preset hash space, to arrange the storage nodes and the super nodes into a loop link according to the node identifiers, and to store information on the loop link. Preferably, the loop link information is built in an order of magnitudes of the node identifiers to facilitate a search for a node. The loop link information includes the sequential node identifiers and routing information corresponding to the node identifiers. The management nodes are further adapted to update the loop link information when a storage node or a super node is added or quits, and can further send initiatively the updated loop link information to a storage node and a super node in the loop link, which are related to the added or quitting storage node or super node, and to the front end nodes, or to all the super nodes and storage nodes.

The storage node and the super node, which are related to the added or quitting storage node include: a preceding storage node and/or a succeeding storage node of the added or quitting storage node in the loop link, and a super node to which the added or quitting storage node is subordinate; and the storage node and the super node which are related to the added or quitting super node include: a preceding super node and/or a succeeding super node of the added or quitting super node in the loop link, and a storage node of which the added or quitting super node is in charge.

The loop link information is, for example, in a form as shown in Table 1 below.

TABLE 1

| Loop link information in a first embodiment | |
|---|---|
| Node Identifier | Routing Information (IP address, port, etc.) |
| Node 1 | IP1 |
| Node 2 | IP2 |
| ... | ... |

In Table 1, the node identifiers are arranged in the column of Node Identifier in an ascending magnitude order, and the node identifier at the end of Table 1 is adjacent to the first node identifier, thereby constituting a loop link.

TABLE 2

| Index information in a second embodiment | | | | |
|---|---|---|---|---|
| Node Identifier | Routing Information | Preceding Node Identifier | Succeeding Node Identifier | Status |
| ... | ... | ... | ... | Online/Offline |

Since Table 2 recites explicitly sequence relationships of the nodes, the nodes in the column of Node Identifier in Table 1 may not necessarily be arranged in order. Furthermore, the information of "Status" identifies whether the respective nodes are available for a service, where "Online" denotes availability and "Offline" denotes unavailability.

The front end nodes each are adapted to receive an insertion request carrying a data identifier and data information (the present embodiment is described by taking an insertion request as an example), to operate the data identifier using a hash algorithm with the hash space to derive a first data Global Unique ID (GUID), and to send the insertion request carrying the first data GUID to a super node with a node identifier closest to the first data GUID according to the loop link information of the super nodes, which is obtained from the management node. If obtaining the routing information of the storage nodes from the super node, the front end node buffers the routing information and the data GUID corresponding to the present insertion request (the insertion request has the corresponding data identifier in one-to-one correspondence to the data GUID, so the insertion request is in a correspondence relationship with the data GUID). Upon reception of an insertion request (or a query request, a deletion request or an update request), the front end node firstly queries a local buffer about whether routing information of a storage node capable of processing the request is stored in the local buffer, and if the routing information is stored in the local buffer, then the front end node sends the insertion request directly to the storage node; otherwise, the front end node sends the insertion request to the super node. The front end node can request periodically the latest loop link information from the management node.

A GUID is widely applied due to its feature of unique identification and is applicable to a registry table, a database, a node identifier, a subscriber, etc. The GUIDs of the individual nodes (i.e., the node identifiers) in the embodiments of the invention are derived by operating the IP addresses (or UDPs or the like) of the respective nodes with the hash algorithm, and the data GUID is derived by operating the data identifier with the hash algorithm.

The node closest to the data GUID refers to a node corresponding to the smallest one among node identifiers larger than the data GUID or a node corresponding to the largest one among node identifiers smaller than the data GUID.

Figure 2:
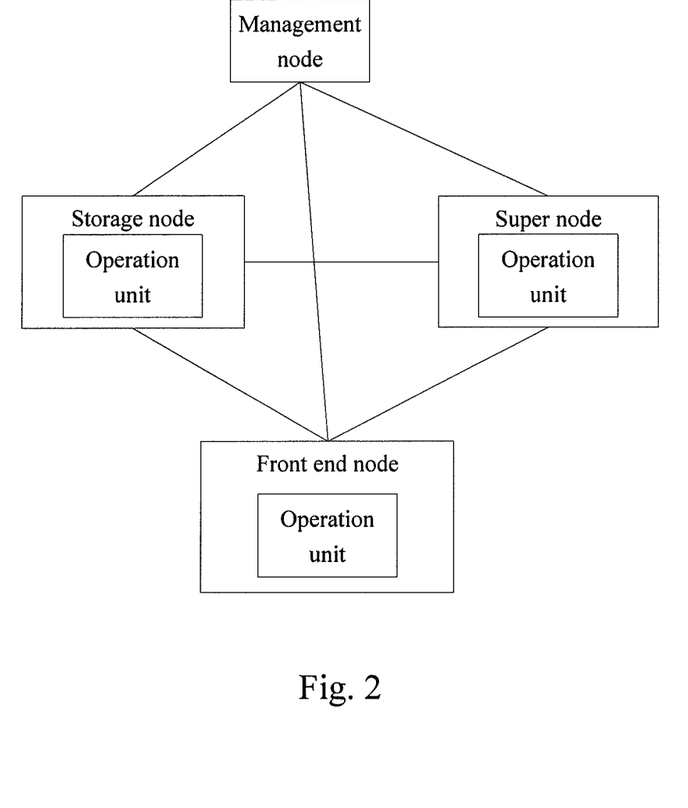
FIG. 2 is a structural diagram of a data storage system including operation units in an embodiment of the invention.

Operation units are located in the front end nodes, the super nodes or the storage nodes, and each are adapted to operate the first data GUID by a preset fixed offset to derive a second data GUID; to determine, from the loop link information obtained from the management node and the second data GUID, a super node with a node identifier closest to the second data GUID; and to forward the insertion request carrying the second data GUID, the data information and a backup flag to the determined super node, as illustrated in FIG. 2. Of course, since there may be plural copies of backup data, the operation unit can further operate the previous data GUID (which is derived from operation by the preset fixed offset) by the preset fixed offset to derive the present data GUID; and then determine, from the loop link information obtained from the management node and the present data GUID, a super node with a node identifier closest to the present data GUID; and forward the insertion request carrying the present data GUID, the data information and a backup flag to the determined super node.

The super nodes each are adapted, upon reception of the insertion request carrying the data GUID, to determine, from the loop link information (which is obtained from the management node) of the super nodes and the storage nodes charged by each of the super nodes, a storage node with a node identifier closest to the data GUID as one that shall process the insertion request. When the super node determines that the insertion request can be taken charge of and processed locally, that is, the super node includes a function of a storage node, the super node may insert the data information in response to the insertion request; and when the super node determines that the insertion request cannot be taken charge of and processed locally, the super node determines a storage node with a node identifier closest to the data GUID as one that shall process the insertion request. The super node can send the insertion request directly to the determined storage node. Alternatively, the super node can send the routing information of the determined storage node to the front end node, which in turn sends the insertion request directly to the storage node. The super node can request the latest loop link information from the management node periodically, or upon determination of that a storage node taken charge of by the super node, the preceding super node of the super node or the succeeding super node of the super node quits providing a service. The super node is further adapted to store index information, which includes the data GUIDs and the node identifiers of the storage nodes, and the index information may be updated when the super node receives an insertion request (or a deletion request, etc.). The super node has functions of both indexing and storage, and the indexing function enables an operation such as searching for data information or inserting data information to be done in two hops from the front end node to the storage node, to thereby expedite processing of the data information. The storage function of the super node is equivalent to that of the storage node introduced below, so that the storage and processing capabilities of the super node are utilized fully to thereby reduce the number of storage nodes and hence of nodes in the loop link and further to save the device cost.

The storage nodes each are adapted to store the data information in response to the received insertion request, and to mark the stored data information with the backup flag when the insertion request carries the backup flag. The storage node can request the latest loop link information from the management node periodically, or upon determination of that a super node to which it is subordinate, its preceding storage node or its succeeding storage node quits providing a service. The storage node is further adapted, upon determination of that its preceding storage node or succeeding storage node in the loop link is unavailable for service provision, to obtain the index information of the preceding storage node or the succeeding storage node from a super node to which the preceding storage node or the succeeding storage node is subordinate, and to instruct the operation unit to operate the data GUID in the index information and determine a super node, i.e., a super node where a backup copy of the data in the preceding storage node or the succeeding storage node quitting providing the service is located; and furthermore, after the determined super node determines from the data GUID derived from operation a storage node, i.e., a storage node where a backup copy of the data in the preceding storage node or the succeeding storage node quitting providing the service is located, then to obtain from the determined storage node the data information of the preceding storage node or the succeeding storage node, i.e., the backup copy of the data in the preceding storage node or the succeeding storage node quitting providing the service, and to notify the super node to which the node quitting providing the service is subordinate that the data of the preceding storage node or the succeeding storage node quitting providing the service is recovered and a subsequent service request may be accepted.

The fixed offset in the present embodiment enables the respective data GUIDs before and after offset operation to be positioned at different storage nodes (which may be possibly subordinate to the same super node or different super nodes), to thereby make the different storage nodes store the same data information; and the data information stored according to the first data GUID is marked as primary data information, and the data information stored according to the second data GUID resulting from offset operation is marked with a backup flag as backup data information, thereby avoiding a conflict due to that the data GUID resulting from operation is the same as a certain data GUID. The super node can know in real time from the index information the data GUIDs stored on the respective storage nodes of which it is in charge, to facilitate the determination of the backup data information corresponding to the data GUIDs, so that it is convenient for a storage node to obtain anew the data information of which it shall be in charge to recovery service provision, or it is convenient for a preceding storage node or a succeeding storage node of a quitting storage node to obtain the backup data information of the quitting storage node, in order that multiple copies of data information is reserved in the data storage system to prevent a service interruption and a loss of the data information.

When an operation unit is located in a front end node, the front end node operates a data identifier in a service request using a preset hash algorithm to derive a first data GUID and determines a first super node from the first data GUID (e.g., 10050), and also operates the first data GUID by the preset fixed offset (e.g., 2^32) to derive a second data GUID and determines a second super node (which may be possibly the same as the first super node) from the second data GUID (i.e., a value derived from 10050+2^32). Then, the front end node sends insertion requests respectively to the first super node and the second super node, with the insertion requests carrying the respective corresponding data GUIDs, and the insertion request sent to the second super node further carrying a backup flag. The first super node and the second super node process the service request in similar ways, and reference can be made to the above introduction of the super nodes.

If an operation unit is located in a super node, after receiving a service request sent from a front end node, a first super node operates a first data GUID by a preset fixed offset to derive a second data GUID and determines a second super node (which may be possibly the same as the first super node) from the second data GUID. The first super node sends an insertion request to a storage node according to the first data GUID, and sends an insertion request carrying an additional backup flag to the second super node according to the second data GUID. The two insertion requests may not necessarily be sent in order, and may be sent concurrently. The second super node in turn sends the insertion request to a determined storage node according to the second data GUID.

When an operation unit is located in a storage node, a first storage node receives and processes an insertion request sent from a first super node, operates a first data GUID by a preset fixed offset to derive a second data GUID, and sends the insertion request carrying the second data GUID and a backup flag to the first super node, which in turn forwards the insertion request to a corresponding second super node (which may be possibly the same as the first super node, in this case, the description of the forwarding process is omitted). The second super node determines from the second data GUID a second storage node for processing the service request and sends the insertion request to the second storage node.

In the present embodiment, an insertion request, a query request, an update request and a deletion request are referred collectively to as a service request. The functions and connectivity relationships of the respective nodes for processing an update request and a deletion request are similar to those for processing an insertion request which have been introduced above, and the description thereof is omitted herein. It shall merely be noted that an insertion request and an update request carry a data identifier and corresponding data information, and upon reception of the insertion request or the update request, a storage node stores the corresponding data information, or updates data information stored in the storage node and corresponding to the data identifier with the corresponding data information; and a query request and a deletion request carry a data identifier, and the storage node queries about or deletes data information stored in the storage node and corresponding to the data identifier, upon reception of the query request or the deletion request.

When a query request is processed and a storage node storing the primary data information is found unavailable, the first data GUID is operated by the fixed offset to derive the second data GUID, and a corresponding storage node is queried according to the second data GUID about backup data information. Alike, when a storage node corresponding to the second data GUID is also unavailable, the second data GUID may further be operated by the fixed offset to derive a third data GUID, and a corresponding storage node is queried according to the third data GUID about backup data information; and so on. Specific processing flows may vary with the different service requests, and processing flows of several service requests will be introduced below.

Figure 3:
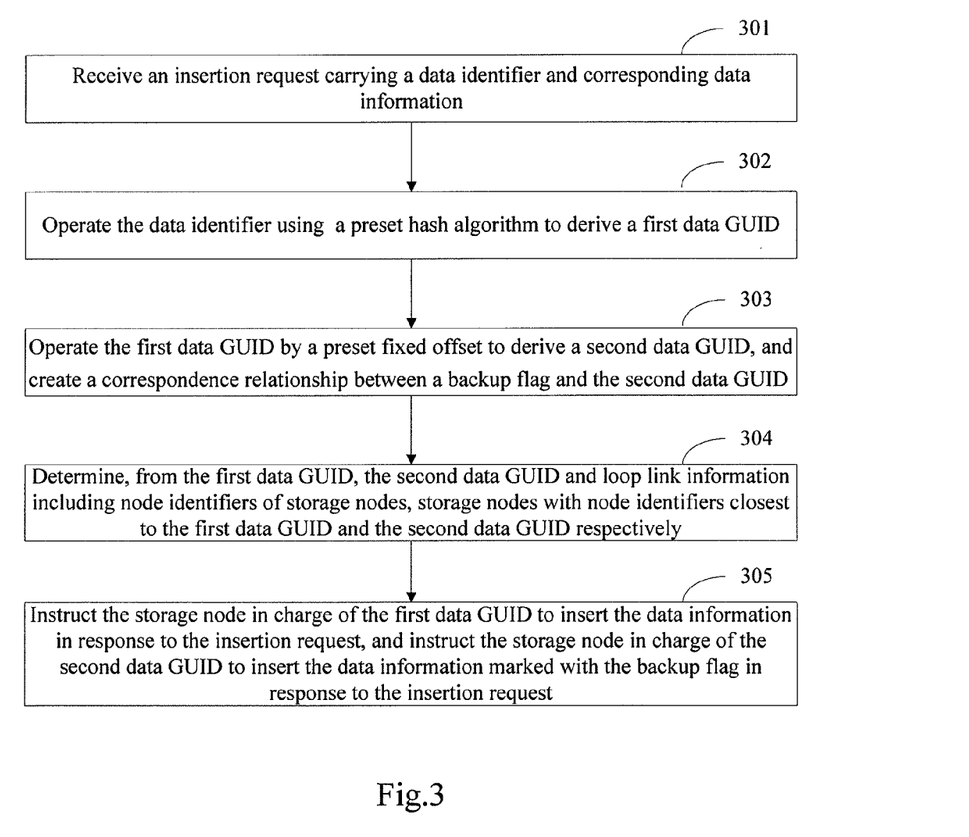
FIG. 3 is a flow chart of a data information insertion method in an embodiment of the invention.

Referring to FIG. 3, a flow of a data information insertion method in the present embodiment is as follows (descriptions will be presented in an example where the same data information is stored in two storage nodes; and of course, a copy of data information may be stored in only one storage node or the same data information may be stored in three or more storage nodes):

Step 301: An insertion request carrying a data identifier and corresponding data information is received.

Step 302: The data identifier is operated with a preset hash algorithm to derive a first data GUID.

Step 303: The first data GUID is operated by a preset fixed offset to derive a second data GUID, and a correspondence relationship between a backup flag and the second data GUID is created.

Step 304: Storage nodes with node identifiers closest to the first data GUID and the second data GUID are determined respectively from the first data GUID, the second data GUID and loop link information including node identifiers of storage nodes.

Step 305: The storage node in charge of the first data GUID is instructed to insert the data information in response to the insertion request, and the storage node in charge of the second data GUID is instructed to insert the data information marked with the backup flag in response to the insertion request.

If there is more than one copy of backup data information, then the second data GUID can further be operated by the preset fixed offset, so that a further copy of backup data information may be inserted.

Processing flows of a deletion request and an update request are similar to that of inserting data information except that the storage nodes originally in charge of the insertion request are instead in charge of processing the deletion request or the update request, and therefore the descriptions of the processing flows of the deletion request and the update request are omitted here.

As for a query request, a method flow thereof is generally as follows: a query request carrying a data identifier is received; the data identifier is operated with a preset hash algorithm to derive a first data GUID; a first storage node with a node identifier closest to the first data GUID is determined from the first data GUID and loop link information including node identifiers of storage nodes; and the first storage node is instructed to query about data information corresponding to the first data GUID in response to the query request.

It shall be noted that a correspondence relationship exists between the data identifier and the data information mentioned in the present embodiment of the invention, and a correspondence relationship exists between the data identifier and the data GUID resulting from direct or indirect operation of the data identifier (e.g., the first data GUID, the second data GUID, etc.), so that a correspondence relationship exists between the data GUID resulting from operation and the data information.

Of course, storage nodes storing the same data information may be queried concurrently for an improved ratio of query success.

Figure 4:
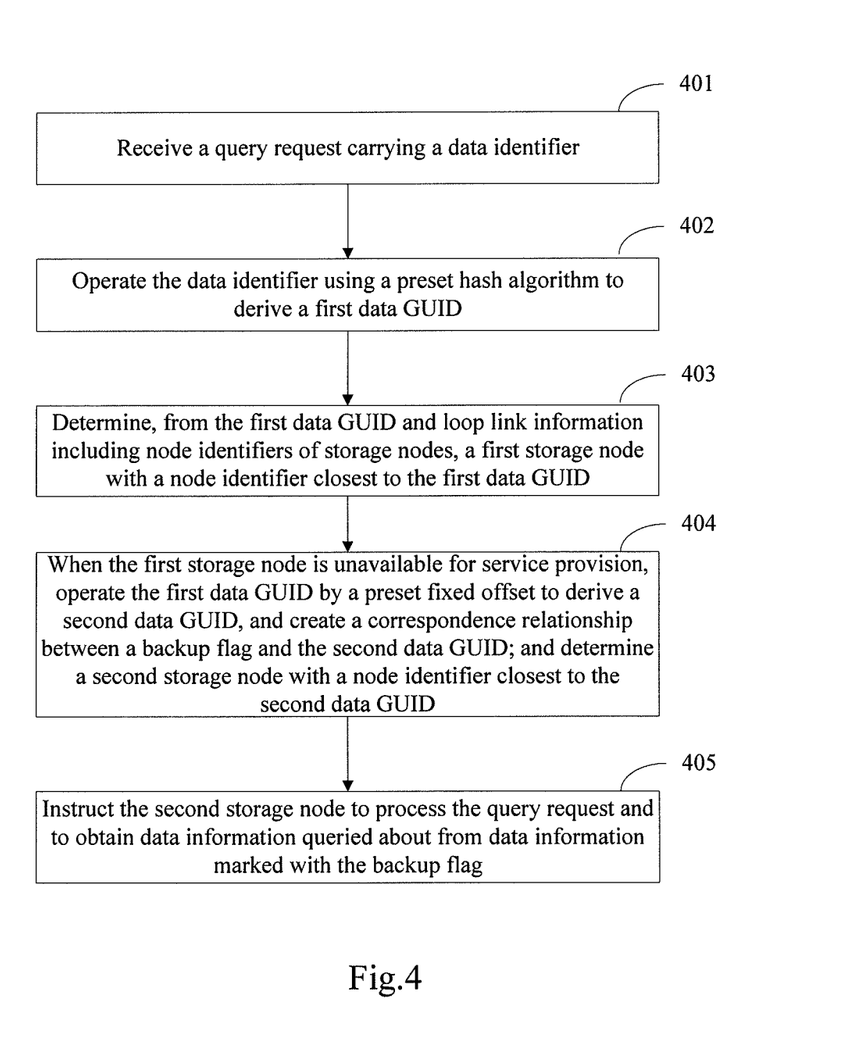
FIG. 4 is a flow chart of a data information query method in an embodiment of the invention.

For a simplified query flow, reference may be made to FIG. 4 for a data information query flow when the first storage node is unavailable for service provision, and a flow of a data information query method in the present embodiment is as follows:

Step 401: A query request carrying a data identifier is received.

Step 402: The data identifier is operated with a preset hash algorithm to derive a first data GUID.

Step 403: A first storage node with a node identifier closest to the first data GUID is determined from the first data GUID and loop link information including node identifiers of storage nodes.

Step 404: When the first storage node is unavailable for service provision, the first data GUID is operated by a preset fixed offset to derive a second data GUID, and a correspondence relationship between a backup flag and the second data GUID is created; and a second storage node with a node identifier closest to the second data GUID is determined; The first storage node may be unavailable for service provision due to a failure or any other reason, or may be temporarily unavailable for service provision due to, for example, an update operation.

Step 405: The second storage node is instructed to process the query request and to obtain data information queried about from data information marked with the backup flag.

Of course, when the second storage node is also unavailable for service provision, the second data GUID can further be operated by the preset fixed offset to derive a third data GUID and to determine a third storage node with a node identifier closet to the third data GUID, and the third storage node is instructed to process the query request; and so on.

The first storage node may be determined to be unavailable for service provision by the first storage node itself (that is, the first storage node quits initiatively), a preceding storage node of the first storage node, a succeeding storage node of the first storage node, a front end node or a super node to which the first storage node is subordinate. The preceding storage node and the succeeding storage node find the first storage node unavailable for service provision by periodically sending a detection signal to the first storage node. After finding the first storage node unavailable for service provision, the preceding storage node and the succeeding storage node report to a management node directly or through a super node to which they are subordinate. The super node and the front end node find the first storage node unavailable for service provision by sending a service request to the first storage node but receiving no returned message and further report to a management node. When quitting initiatively, the first storage node shall report to a management node directly or through a super node to which it subordinate.

When the front end node fails to be connected with a first super node, the front end node may send a service request to a preceding super node or a succeeding super node of the first super node; or operate a first data GUID by a fixed offset to determine a second super node from a second data GUID and sends the service request to the second super node.

Figure 5:
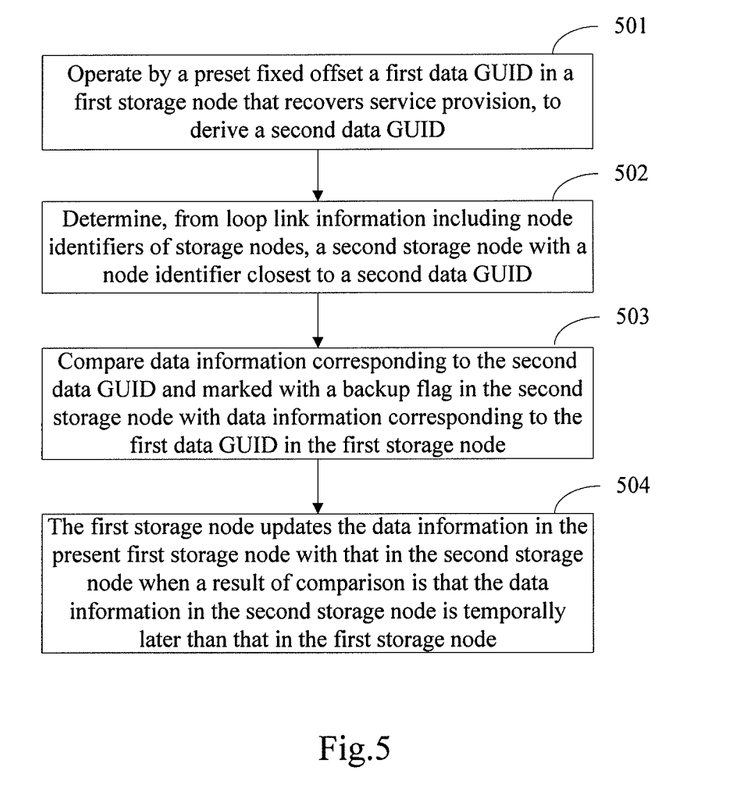
FIG. 5 is a flow chart of a data information update method in an embodiment of the invention.

Either addition or quitting of a node may influence the loop link, and possibly the storage of data information. When the first storage node recovers service provision after a period of time since it quitted, a flow of a data information update method in the present embodiment is as follows, as shown in FIG. 5:

Step 501: A first data GUID in a first storage node recovered for service provision is operated by a preset fixed offset to derive a second data GUID.

The first data GUID may be derived by operating a data identifier of data in the first storage node using a hash algorithm with a hash space.

Step 502: A second storage node with a node identifier closest to the second data GUID is determined from loop link information including node identifiers of storage nodes.

Firstly a super node with a node identifier closest to the second data GUID may be determined from loop link information including node identifiers of super nodes, and then the determined super node can determine, from loop link information including node identifiers of storage nodes, the second storage node with a node identifier closest to the second data GUID.

Step 503: Data information marked with a backup flag and corresponding to the second data GUID in the second storage node is compared with data information corresponding to the first data GUID in the first storage node.

Step 504: The first storage node updates the data information in the present first storage node with that in the second storage node, if a result of the comparison is that the data information in the second storage node is temporally later than that in the first storage node.

Stated otherwise, if data information is updated in the period when the first storage node is unavailable for service provision, that is, a backup copy of the data information stored in the second storage node is updated, then the updated data information is definitely temporally later than the data information before the update, and therefore the data information stored in the first storage node shall be updated correspondingly after the first storage node is recovered for service provision.

Furthermore, if the second storage node also quits providing a service, then a further storage node storing a backup copy of the data in the first storage node needs to be determined and updated data information is obtained from the further storage node in a flow similar to that shown in FIG. 5.

When the first storage node quits providing a service and has not been recovered for a period of time, a preceding storage node and/or a succeeding storage node of the first storage node obtains a first data GUID of the first storage node (including a data GUID of primary data information and a data GUID of backup data information) from a super node to which the first storage node is subordinate, operates the first data GUID by a preset fixed offset to derive a second data GUID, and sends the derived second data GUID to a super node to which they are/it is subordinate, and the super node determines whether it in itself is the super node with a node identifier closest to the second data GUID from loop link information, and if so, it further determines a second storage node with a node identifier closest to the second data GUID, obtains backup data information of the first storage node from the second storage node and forwards the backup data information of the first storage node to the preceding storage node and/or the succeeding storage node of the first storage node; otherwise it sends a recovery request to a second super node with a node identifier closest to the second data GUID in accordance with the loop link information, and the second super node forwards the recover request to the second storage node with a node identifier closest to the second data GUID, thereby obtaining and forwarding backup data information of the first storage node to the preceding storage node and/or the succeeding storage node of the first storage node. After obtaining the backup data information of the first storage node, the preceding storage node and/or the succeeding storage node of the first storage node notifies the super node to which the first storage node is subordinate that the data of the first storage node has been recovered.

If the first storage node quits due to a failure, then a preceding storage node or a succeeding storage node of the first storage node, a super node to which the first storage node is subordinate, or a management node may initiate the above data recover process, and if the first storage node quits initiatively, then it is possible that the first storage node initiates the above data recover process and notifies the preceding storage node or the succeeding storage node of the first storage node, the super node to which the first storage node is subordinate, or the management node.

Backup data information of the first storage node may be shared among a plurality of second storage nodes. For example, the first storage node is in charge of data GUIDs in a range from 1 to 10000, and a range from $2^{32}$ to $10000+2^{32}$ is derived from operation of the data GUIDs by a fixed offset, in this case, according to such a management principle that a node identifier is the closest to a data GUID, it is possible that backup data information of $2^{32}$ to $2^{32}+5000$ is stored in a second storage node 1 and backup data information of $2^{32}+5001$ to $10000+2^{32}$ is stored in a second storage node 2, but the respective second storage nodes 1 and 2 are determined in the same process except for different data GUIDs derived from operation.

Backup information of a super node (e.g., backup information of index information) is stored on another super node positioned by the node identifier of the former plus a fixed offset; and the index information is stored in a process similar to that for the data information, and descriptions thereof are omitted here.

Software for implementing the embodiments of the invention can be stored in a storage medium including a floppy disk, a hard disk, an optical disk, a flash memory, etc.

The embodiments of the invention provide a data storage system which enables distributed storage of data information, and if the system is applied to improve the existing HSS, then the existing centralized structure can be replaced with the distributed structure, and the current expensive HSS can be replaced with a plurality of general servers to thereby save a networking cost. Furthermore, the system is distributed throughout the network without distinguishing a roaming location and a home location, a VLR registration process can be dispensed with, and required subscriber information can be located rapidly in any region, to thereby conserve a signaling flow, to improve a processing speed and to save resources of the system. The embodiments of the invention further allocate node identifiers for super nodes and storage nodes in the system using a hash algorithm with a hash space to constitute a loop link, the three-layer structure consisted of front end nodes, super nodes and storage nodes enables required data information to be located in two hops in any region, so that the processing speed can be further improved, and the loop link structure is convenient to maintain and extend. Moreover, copies of data information are stored in the data storage system in the embodiments of the invention, and when a certain super node or storage node quits providing a service, another corresponding super node or storage node can provide the service immediately without any process in which a backup server has to detect a primary server, so that continuity of the service can be maintained effectively and timely processing of the data information can be guaranteed. Also in the methods for storing data information in the embodiments of the invention, when a certain storage node quits providing a service, another storage node can duplicate initiatively a copy of backup data information, and thus copies of data information can be maintained in the data storage system to thereby avoid an influence upon the system due to concurrent quitting of a plurality of storage nodes from the service.

Evidently, those skilled in the art can make various modifications and variations to the invention without departing from the scope of the invention. Accordingly, the invention is also intended to encompass these modifications and variations provided they fall within the scope of the appended claims and equivalents thereof.

The invention claimed is:

1. A data storage system in a communication network, wherein the data storage system comprises front end nodes, storage nodes, super nodes and management nodes;

management nodes comprise
   a first storage medium containing an allocation software, a first processing software, a first transmit software and a first processor; and wherein the first processor which upon executing the allocation software allocates node identifiers for the storage nodes and the super nodes in a hash space, wherein, the storage nodes and the super nodes are arranged into a loop link according to the node identifiers;
   the first processor which upon executing the first processing software stores information of the loop link, wherein, the information of the loop link comprises node identifiers and routing information for the storage nodes and the super nodes in the loop link; and the first processor which upon executing the first transmit software transmits the information of the loop link to the front end nodes, and the super nodes;
   the front end nodes comprise a second storage medium containing a first receive software, a second processing software, a first obtainer software, a second transmit software and a second processor; and wherein the second processor which upon executing the
   first receive software receives the information of the loop link from the management nodes, and to receive a service request carrying a data identifier;
   the second processor which upon executing the second processing software derives a current data Global Unique Identifier, GUID, using a hash algorithm with the data identifier from the hash space;
   the second processor which upon executing the first obtainer software obtains, from the node identifiers for the super nodes in the information of the loop link, a current super node identifier for a current super node closest in value to the current data GUID; and
   the second processor which upon executing the second transmit software sends the service request and the current data GUID to the current super node according to routing information of the current super node in the information of the loop link;
   a third storage medium containing a second receive software, a second obtainer software, a third transmit software and a third processor; and wherein the third processor which upon executing the second receive software receives the information of the loop link from the management nodes and receives the service request and the current data GUID from the front end nodes;

the third processor which upon executing the second obtainer software determines, from the node identifiers for the storage nodes in the information of the loop link, a current storage node identifier for a current storage node closest in value to the current data GUID; and the third processor which upon executing the third transmit software sends the service request and the current data GUID to the current storage node according to routing information for the current storage node; and a fourth storage medium containing a third receive software, a third processing software and a fourth processor; and wherein the fourth processor which upon executing the third receive software receives the service request and the current data GUID; and the fourth processor which upon executing the third processing software processes data information corresponding to the current data GUID in response to the service request received by the fourth processor upon executing the third receive software.

2. The data storage system according to claim 1, wherein the service request is an insertion request for inserting data, a deletion request for deleting data, an update request for updating data or a query request for querying about data.

3. The data storage system according to claim 1, wherein the third storage medium further contains a fourth processing software and the third processor which upon executing the fourth processing software processes the data information corresponding to the current data GUID in response to the service request received by the third processor upon executing the second receive software, and disables the second obtainer software and the third transmit software.

4. The data storage system according to claim 1, wherein the third storage medium further contains a fourth transmit software; and the third processor which upon executing the fourth transmit software sends routing information for the current storage node to the front end nodes, and disables the third transmit software;

the second processor which upon executing the first receive software further receives the routing information for the current storage node from the super nodes; and the second processor which upon executing the second transmit software further sends the service request to the current storage node according to the routing information for the current storage node received by the second processor upon executing the first receive software.

5. The data storage system according to claim 4, wherein the second storage medium in the front end nodes further contains a fifth processing software; and the second processor which upon executing the fifth processing software stores a corresponding relationship between the current data GUID derived by the second processor upon executing the second processing software and the routing information of the current storage node received by the second processor upon executing the first receive software; and wherein, when a subsequent service request carrying a same data identifier is received by the second processor upon executing the first receive software, and a same current data GUID is derived by the second processor upon executing the second processing software subsequently, then the routing information of the current storage node can be retrieved from the second storage medium according to the current data GUID, and the subsequent service request can be sent to the current storage node by the second processor upon executing the second transmit software according to the retrieved routing information for the current storage node.

6. The data storage system according to claim 1, wherein the front end nodes, the super nodes or the storage nodes further comprise operation units;

and the second processor, the third processor or the fourth processor which upon executing the operation units updates the current data GUID by adding a preset fixed offset to the current data GUID; and wherein, when the operation units are configured in the front end nodes, a backup flag is transmitted in addition to the service request and an updated current data GUID by the second processor upon executing the second transmit software in the front nodes;

when the operation units are configured in the super nodes, the backup flag is transmitted in addition to the service request and the updated current data GUID by the third processor upon executing the third transmit software in the super nodes; and when the operation units are configured in the storage nodes, the first processor which upon executing the first transmit software in the management nodes further transmits the information of the loop link to the storage nodes;

the fourth processor which upon executing the third receive software in the storage nodes further receives the information of the loop link from the management nodes; and the fourth storage medium further contains a third obtainer software and a fifth transmit software; and the fourth processor which upon executing the third obtainer software determines, from the node identifiers for the storage nodes in the information of the loop link, a second current storage node identifier for a second current storage node closest in value to the updated current data GUID; and the fourth processor which upon executing the fifth transmit software sends the service request and the updated current data GUID together with the backup flag to the second current storage node with the second current storage node identifier determined by the fourth processor upon executing the third obtainer software according to routing information for the second current storage node with the second current storage node identifier determined by the fourth processor upon executing the third obtainer software.

7. The data storage system according to claim 6, wherein when the fourth processor which upon executing the third receive software receives the service request and the current data GUID together with the backup flag, the fourth processor which upon executing the third processing software processes the data information corresponding to the current data GUID and marked with the backup flag.

8. The data storage system according to claim 6, wherein the third storage medium in the super nodes further contains a sixth processing software; and the third processor which upon executing the sixth processing software stores index information comprising the current data GUID and the current storage node identifier of the current storage node; and wherein, when the operation units are configured in the storage nodes, then the fourth storage medium further contains a detection software, a retrieve software and a backup software; and the fourth processor which upon executing the detection software detects whether a preceding storage node or a succeeding storage node in the loop link is unavailable for service provision; and the fourth processor which upon executing the retrieve software retrieves the current data GUID from the third storage medium when the current storage node is detected to be unavailable by the fourth processor upon executing the detection software, and enables the operation units and the third obtainer software; and the fourth processor which upon executing the backup software reads, from the second current storage node with the second current storage node identifier determined by the fourth processor upon executing the third obtainer software, data information corresponding to the current data GUID and backup the data information.

9. The data storage system according to claim 1, wherein the first storage medium further contains an updating software; and the first processor which upon executing the updating software updates the information of the loop link when at least one storage node or at least one super node is added or quits; and wherein, the first processor which upon executing the first transmit software further sends the updated information of the loop link to the storage nodes and the super nodes in the loop link, which are related to an added storage node, an added super node, a quitting storage node, or a quitting super node; and wherein, the second storage medium further contains an access software; and the second processor which upon executing the access software accesses periodically the management nodes and obtains latest information of the loop link; and wherein, the third storage medium further contains a first request software; and the third processor which upon executing the first request software requests the latest information of the loop link from the management nodes, periodically or upon determination of that a storage node belonging to the super node, or a preceding super node or a succeeding super node of the super node quits providing a service; and the fourth storage medium further contains a second request software; and the fourth processor which upon executing the second request software requests the latest information of the loop link from the management nodes, periodically or upon determination of that a super node to which the storage node belongs, a preceding or succeeding storage node of the storage node quits providing a service.

10. A method for processing data information, the method comprising:

receiving a service request carrying a data identifier;

deriving a current data Global Unique Identifier, GUID, using a hash algorithm with the data identifier;

determining, from node identifiers for storage nodes in pre-stored information of a loop link, a current node identifier for a current storage node closest in value to the current data GUID;

transmitting the service request and the current data GUID to the current storage node with the current node identifier closest in value to the current data GUID; and instructing the current storage node to process data information corresponding to the current data GUID in response to the service request.

11. The method according to claim 10, wherein the service request is an insertion request for inserting data, a deletion request for deleting data, an update request for updating data or a query request for querying about data.

12. The method according to claim 11, wherein when the service request is the query request and the current storage node instructed to process the query request is unavailable for service provision, the method further comprises:

creating a updated current data GUID by adding a preset fixed offset to the current data GUID;

creating a corresponding relationship between a backup flag and the updated current data GUID;

determining, from node identifiers for storage nodes in the information of the loop link, a second current node identifier for a current storage node closest in value to the updated current data GUID;

transmitting the service request and the updated current data GUID to the current storage node with the second current node identifier closest in value to the updated current data GUID; and instructing the current storage node with the second current node identifier closest in value to the updated current data GUID to process the query request and obtain the data information queried about from data information marked with the backup flag.

13. The method according to claim 10, wherein, the current data GUID is updated by adding a preset fixed offset thereto.

14. A method for updating data information, the method comprising:

deriving by a first storage node, when the first storage node recovers service provision, a second data Global Unique Identifier, GUID, by adding a preset fixed offset to a first data GUID stored in the first storage node;

determining by the first storage node, from node identifiers for storage nodes in pre-stored information of a loop link, a node identifier for a second storage node closest in value to the second data GUID;

comparing, by the first storage node, data information corresponding to the second data GUID and marked with a backup flag in the second storage node with the node identifier closest in value to the second data GUID with data information corresponding to the first data GUID in the first storage node; and updating, by the first storage node, the data information corresponding to the first data GUID in the first storage node with the data information corresponding to the second data GUID and marked with the backup flag in the second storage node, when a result of the comparison is that the data information corresponding to the second data GUID and marked with the backup flag in the second storage node is temporally later than the data information corresponding to the first data GUID in the first storage node.

15. The method according to claim 14, wherein when the second storage node is unavailable for service provision, the method further comprises:

deriving, by the first storage node, a third data GUID by adding the preset fixed offset to the second data GUID;

determining by the first storage node, from node identifiers for storage nodes in the information of the loop link, a node identifier for a third storage node closest in value to the third data GUID;

comparing, by the first storage node, data information corresponding to the third data GUID and marked with a second backup flag in the third storage node with the node identifier closest in value to the third data GUID with data information corresponding to the first data GUID in the first storage node; and updating, by the first storage node, the data information corresponding to the first data GUID in the first storage node with the data information corresponding to the third data GUID and marked with the second backup flag in the third storage node, when a result of comparison is that the data information corresponding to the third data GUID and marked with the second backup flag in the third storage node is temporally later than the data information corresponding to the first data GUID in the first storage node.

16. A method for processing data in a communication network, wherein the communication network comprises management nodes, front end nodes, super nodes and storage nodes, and the method comprises:

allocating, by the management nodes, node identifiers for the storage nodes and the super nodes in a hash space, arranging the storage nodes and the super nodes into a loop link according to the allocated node identifiers, storing information of the loop link, and transmitting the information of the loop link to the front end nodes, the super nodes and the storage nodes;

storing, by the front end nodes, the super nodes and the storage nodes, the information of the loop link, wherein, the information of the loop link comprises the node identifiers and routing information for the storage nodes and the super nodes in the loop link;

deriving, by the front end nodes, after receiving a service request carrying a data identifier, a current data Global Unique Identifier, GUID, using a hash algorithm with the data identifier from the hash space, obtaining from the node identifiers for the super nodes in the information of the loop link a current super node identifier for a current super node closest in value to the current data GUID, and sending the service request and the current data GUID to the current super node according to routing information for the current super node in the information of the loop link;

determining, by the current super node, after receiving the service request and the current data GUID from the front end nodes, from the node identifiers for the storage nodes in the information of the loop link a current storage node identifier for a current storage node closest in value to the current data GUID, and sending the service request and the current data GUID to the current storage node according to routing information for the current storage node in the information of the loop link; and processing, by the current storage node, data corresponding to the current data GUID after receiving the service request and the current data GUID from the current super node.

17. The method according to claim 16, further comprising:
updating, by the management nodes, the information of the loop link when at least one storage node or at least one super node is added or quits.

18. The method according to claim 17, further comprising:
sending, by the management nodes, the updated information of the loop link to the storage nodes and the super nodes in the loop link, which are related to an added storage node, an added super node, a quitting storage node, or a quitting super node, and to the front end nodes; or sending, by the management nodes, the updated information of the loop link to all super nodes and all storage nodes, and to the front end nodes.

19. The method according to claim 18, wherein, the storage nodes and the super nodes in the loop link which are related to an added storage node or a quitting storage node comprise: a preceding storage node and/or a succeeding storage node of the added storage node or the quitting storage node in the loop link, and a super node to which the added storage node or the quitting storage node belongs; and/or the storage nodes and the super nodes in the loop link which are related to an added super node or a quitting super node comprise: a preceding super node and/or a succeeding super node of the added super node or the quitting super node in the loop link; and a storage node belonging to the added super node or the quitting super node.

20. The method according to claim 16, further comprising:
accessing, by the front end nodes, periodically the management nodes and obtaining latest information of the loop link; and/or requesting, by the super nodes, the latest information of the loop link from the management nodes, periodically or upon determination of that a storage node belonging to the super node, or a preceding super node or a succeeding super node of the super node quits providing a service; and/or requesting, by the storage nodes, the latest information of the loop link from the management nodes, periodically or upon determination of that a super node to which the storage node belongs, a preceding or succeeding storage node of the storage node quits providing a service.

21. The method according to claim 20, further comprising:
retrieving, by the current storage node, after detecting that a preceding storage node or a succeeding storage node of the current storage node in the loop link is unavailable for service provision, a first data GUID corresponding to the preceding storage node or the succeeding storage node from index information stored in a super node to which the preceding storage node or the succeeding storage node belongs, wherein, the index information comprises a corresponding relationship between a data GUID and a storage node identifier of a storage node;

adding, by the current storage node, a preset fixed offset to the first data GUID to obtain a second data GUID;

determining, by the current storage node, from the node identifiers for the storage nodes in the information of the loop link a first storage node identifier for a first storage node closest in value to the second data GUID; and obtaining, by the current storage node, data information corresponding to the first data GUID from the first storage data, and backing up the data information in the current storage node.

* * * * *